F. FEHR.
PROCESS AND APPARATUS FOR EXTRACTING ALCOHOL FROM LIQUIDS.
APPLICATION FILED NOV. 22, 1916.

1,345,437.

Patented July 6, 1920.
3 SHEETS—SHEET 1.

Witnesses:
U. P. Kilroy

Inventor:
Frank Fehr
By Miller Chundahl Parker
Attys.

UNITED STATES PATENT OFFICE.

FRANK FEHR, OF LOUISVILLE, KENTUCKY.

PROCESS AND APPARATUS FOR EXTRACTING ALCOHOL FROM LIQUIDS.

1,345,437. Specification of Letters Patent. Patented July 6, 1920.

Application filed November 22, 1916. Serial No. 132,743.

*To all whom it may concern:*

Be it known that I, FRANK FEHR, a citizen of the United States, residing at Louisville, in the county of Jefferson and State of Kentucky, have invented certain new and useful Improvements in Processes and Apparatus for Extracting Alcohol from Liquids, of which the following is a specification.

This invention relates to the art of extracting alcohol from liquids and aims to provide a novel and improved method and means of producing from a normally alcoholic beverage an improved beverage having very little or no alcohol therein. The invention refers particularly, though not essentially, to the production of a beverage made by extracting alcohol from beer.

Most methods heretofore used for dealcoholizing beverages are unsatisfactory because during the process of extracting the alcohol, certain characteristics of the original beverage, as, for example, the taste, color, aroma, life, zest, foaming quality, or keeping or nourishing qualities, are materially changed, and furthermore the prior methods have been time consuming to an impractical degree.

One of the objects of the present invention is to provide an improved method of producing a beverage by extracting alcohol therefrom without changing the other constituents, characteristics or qualities of the original liquid in any respect.

Another object is to provide a method by which a part or all of the alcohol may be extracted more rapidly than has heretofore been possible.

A further object is to improve the taste and zest of the new product by incorporating with the liquid a suitable flavoring material in a novel manner. If the liquid being treated is beer, extracts of hops may be employed for this purpose, but other flavoring material may be used to produce the desired result.

A further object of the invention is to provide a process by which the extraction of alcohol may be carried on continuously.

Another object is to produce an improved apparatus by which the process may be carried out.

Further objects and advantages will be understood from a perusal of the following detailed description.

Figure 1:
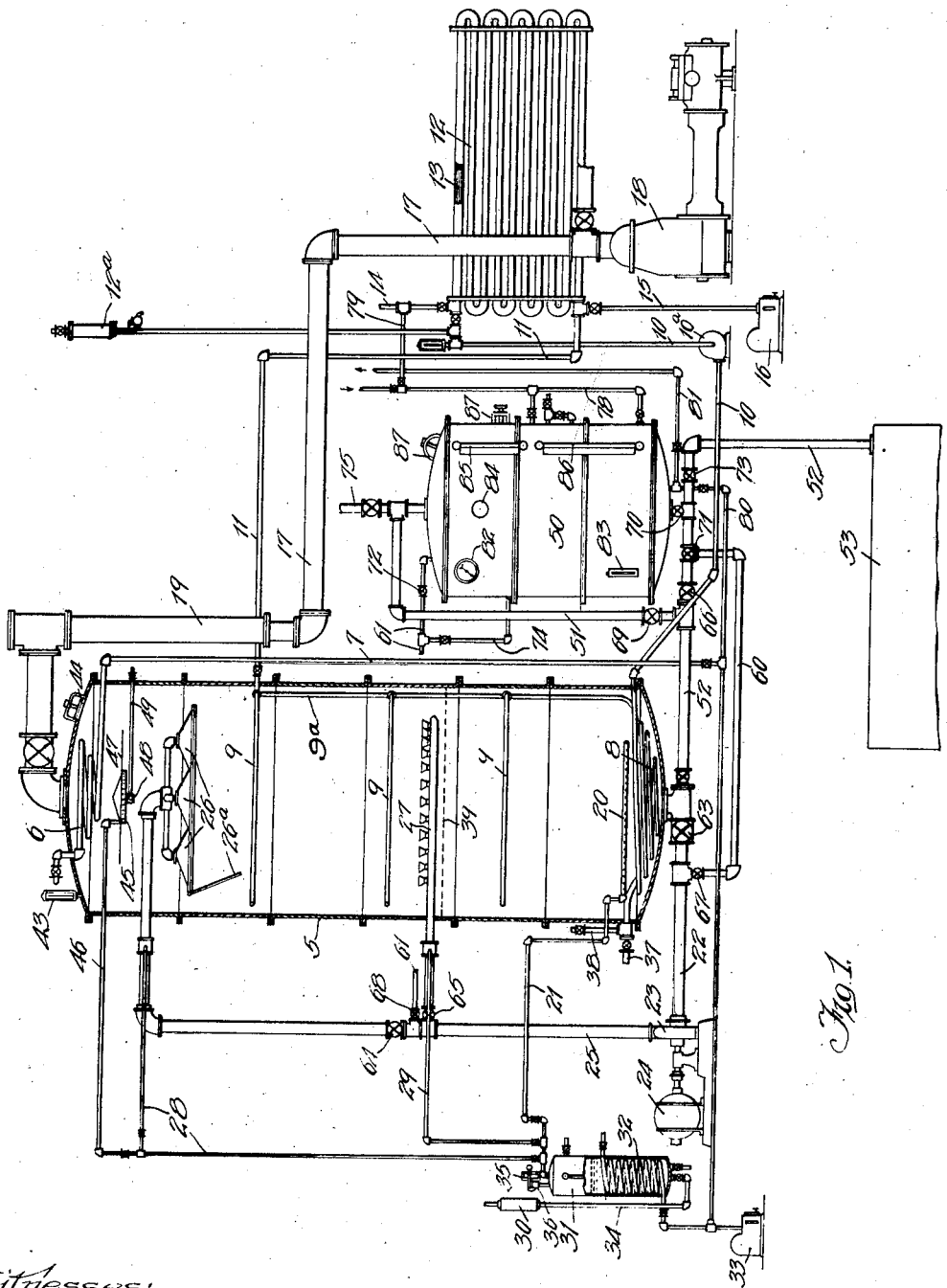
Figure 2:
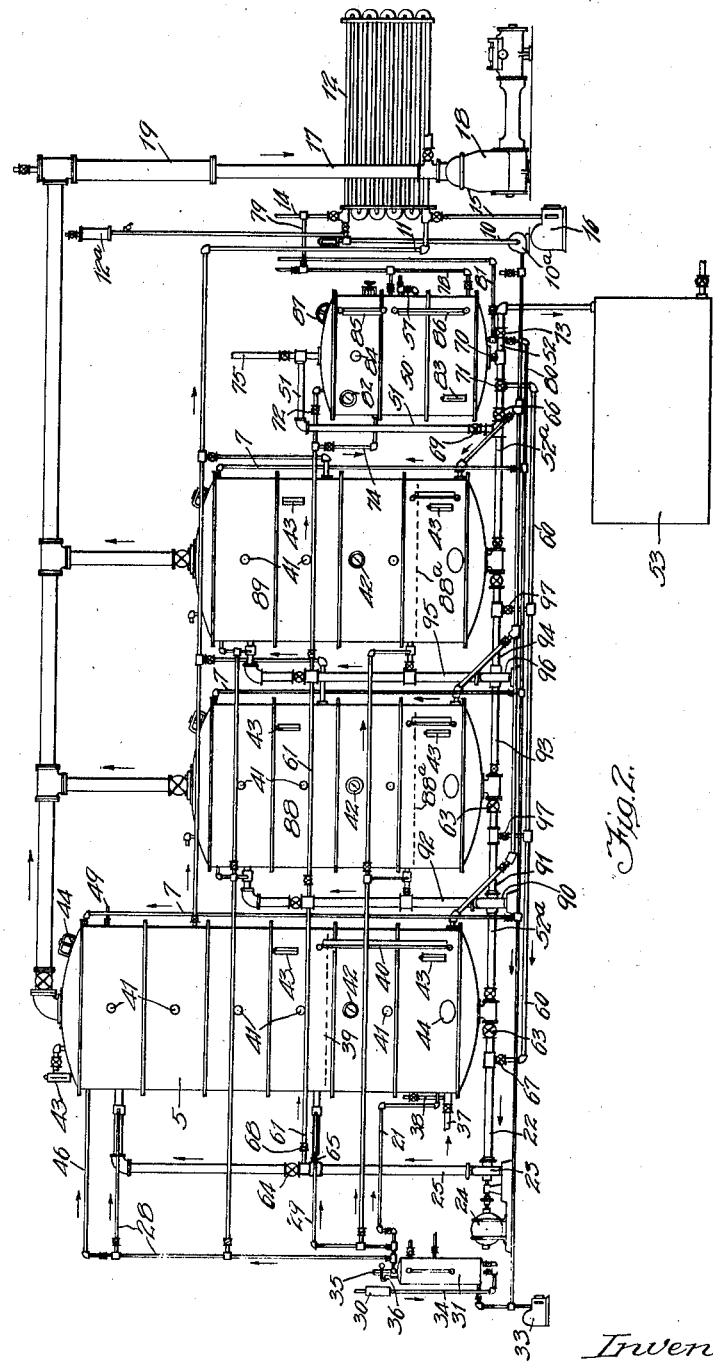
Figure 3:
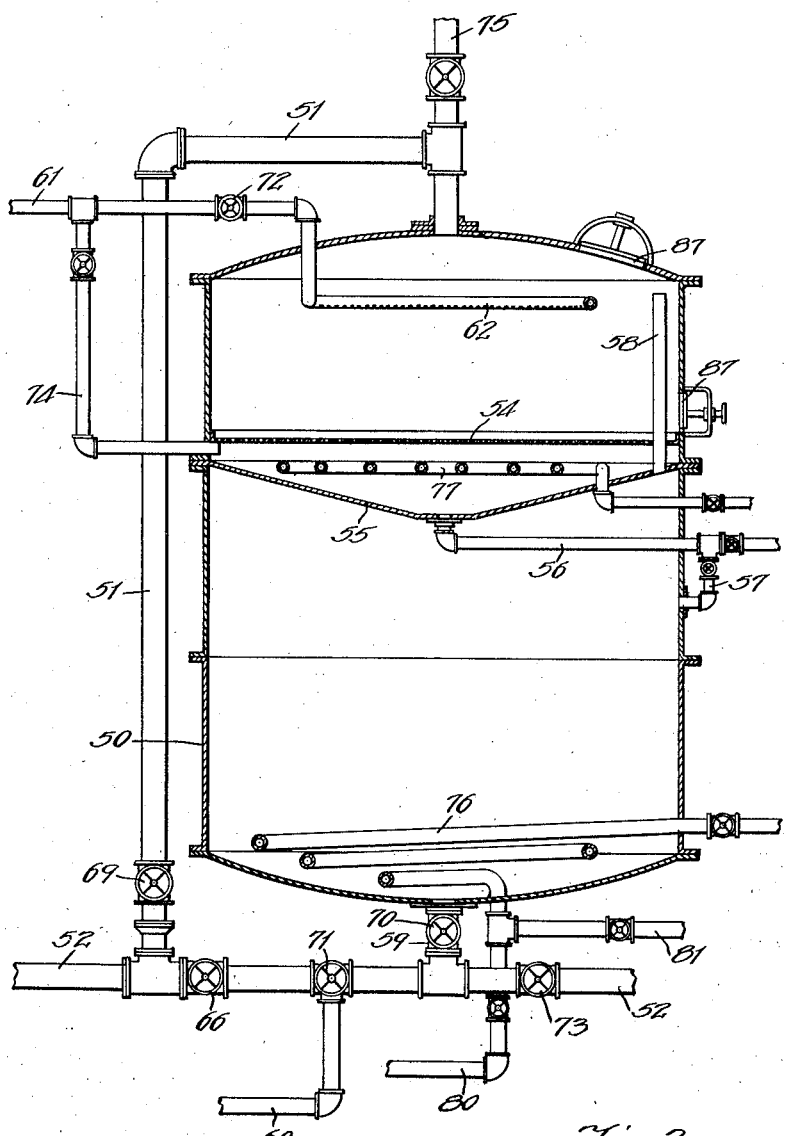

In the accompanying drawings, Figure 1 represents in a somewhat diagrammatic way an apparatus embodying my invention and by which my improved process may be effectively carried out. Fig. 2 is a diagrammatic view illustrating a modified embodiment of the invention. Fig. 3 is a sectional view illustrating the means for preparing the flavoring material.

Briefly described, the process, in the manner in which I prefer to practice it, comprises the steps of placing the original beverage in a closed tank, heating the liquid to a temperature sufficient to volatilize the alcohol but not sufficient to cause coagulation of the albuminoids or to produce other changes in the character of the organic constituents of the liquid; creating an exhaust current from said tank to maintain a vacuum therein and to draw off the volatilized alcohol; continuously agitating the body of the liquid to expedite the volatilization of the alcohol, for example, by injecting a gaseous fluid (preferably heated and purified air) into the lower end of the tank and allowing the fluid to bubble up through the body of the liquid; circulating the liquid and causing it to be broken up or finely spread out preferably by encountering or passing through spraying devices in the tank; injecting gaseous fluid (preferably heated and purified air) into the stream of liquid to mix with the liquid and pass therewith through the spraying devices, so as to cause the alcohol to be broken up into a fine mist, the better to volatilize and release the alcohol content; and preventing the foam which accumulates in the tank from being drawn off with the volatilized alcohol, preferably by breaking the foam bubbles at the upper end of the tank. The manner in which I prefer to accomplish this latter result is to direct a current of air or other gaseous fluid against the foam to break up the bubbles.

If desired, the process may be carried on continuously by providing a plurality of tanks, as shown in Fig. 2, each equipped with suitable treating devices, and by removing only part of the alcohol in the first tank and then passing the liquid to the second tank for further treatment and then to the third tank, if any, and so on, the liquid being thus treated in steps.

To add flavor and zest to the product the liquid may be caused to absorb the volatile aromatic elements of a suitable flavoring material (such as hops, if the original beverage being treated is beer) the aromatic ingredients preferably being prepared by treating the flavoring material in a closed vacuum tank and causing the volatile elements therefrom to be absorbed into the liquid. The residuary extracts of the hops may also be added to the liquid at a suitable time or stage.

The description herein contained of the process and the apparatus for carrying it out is made quite detailed, for the sake of lucidity, but it should be understood that no limitation of the invention to the exact disclosure is intended. I aim to cover in the appended claims all modifications and equivalents falling within the scope of my invention.

Referring to Fig. 1 of the drawings, the preferred form of apparatus for carrying out the process comprises a closed tank 5 preferably of sectional steel construction and glass enameled interiorly. The tank is equipped with heating means both at its upper and lower ends and also, in this instance, intermediate its ends, so that a suitable temperature may be maintained throughout. In the preferred arrangement, this heating means comprises a steam coil 6 in the upper end of the tank which communicates through a pipe 7 with a suitable source of steam supply. The remainder of the tank and especially the lower portion is preferably heated by a hot water circulating system, which may comprise a coil 8 in the bottom of the tank and a suitable number of coils 9 above the coil 8 and properly spaced apart, said coils 8 and 9 being joined, in a continuous circuit by intermediate sections 9ª and communicating through pipes 10 and 11 with a water heater 12. The coils 9 appear in edge elevation only in Fig. 1. This water heater in the exemplary form shown comprises pipes of sinuous formation, within which are steam pipes 13 for heating the water, the steam being supplied at 14 from a suitable source and exhausting through a pipe 15 into a trap 16. A pump 10ª circulates the water. 12ª is an expansion tank connected to the heater. Other forms of circulating water heating systems or other means for heating the tank may be employed if desired. The lower portion of the tank which contains the liquid is heated by hot water in preference to steam, for the reason that with the hot water system the temperature of the coils in the tank may be more definitely regulated and varied at will and the coils may be more easily maintained at a temperature which will not coagulate the albuminoids or "scorch" the liquid, or produce any other changes in the character of the organic constituents of the liquid. A further advantage of heating the tank by hot water is that the process may be carried out at a lower temperature so that the alcohol may be released with less tendency to also give off other volatile ingredients of the original liquid. The original characteristics may thereby be retained.

An exhaust current is continuously drawn off from the tank to carry away air, volatilized alcohol, and carbonic acid gas from the beer, through an exhaust conductor 17 which is connected to a suitable vacuum pump 18. 19 indicates a condenser in which the alcohol vapor is condensed. The steam coil 6 maintains the upper end of the tank at the proper temperature to prevent premature condensation of the alcohol vapor.

The body of the liquid in the tank is preferably agitated continuously. Such agitation may be effected in different ways, either by mechanically-driven paddles or by forcing gaseous fluid therethrough or both. In the present instance, the agitation is accomplished by injecting gaseous fluid (preferably heated and purified air) into the liquid from a suitable coil or conductor 20 in the tank which is supplied with air from a pipe 21 leading from the purifying and heating means to be later described. The agitation of the liquid improves its quality and also expedites the release of alcohol therefrom.

The means for circulating the liquid and causing it to be broken up or finely subdivided in the tank comprises in the present instance a conductor 22 communicating with the lower end of the tank and leading to a centrifugal pump 23 which may be driven by a motor 24. The outlet from the pump has connected thereto a conductor 25 leading upwardly and preferably having two branches which extend into the tank and are arranged to deliver liquid to suitable dividing or spraying devices 26 and 27 respectively located above the body of the liquid, the spray being directed downwardly from the upper spraying devices and upwardly from the lower devices. The pump 23 draws liquid from the lower part of the tank and forces it through the spraying devices. The bottom plates 26ª of the spray heads or devices may be hinged to the heads to facilitate cleaning thereof.

In order to more thoroughly break up or atomize the liquid discharged at the spraying devices 26 and 27, means is preferably provided for injecting gaseous fluid into their supply conductors, the fluid preferred being heated and purified air which is supplied through suitable pipes 28 and 29 connected to heating and purifying means to be presently described. The pipes inject the heated air into the liquid in the conductors preferably just prior to its passage through the spraying devices, the mixed air and liquid passing together through the spraying devices and the liquid being thus caused to be broken up into a very fine mist, thereby expediting the release of the alcohol therefrom.

While I prefer to effect the breaking up or subdividing of the liquid by spraying the liquid, the result may be accomplished by causing the liquid to flow over plates or other devices in a thin sheet or stream so as to expose every part of the liquid and thus facilitate the escape of the alcohol.

The heating and purifying of the air may be accomplished in any desired way. The means herein shown for that purpose comprises a cotton or other suitable filter 30, through which the air passes, and a tank 31 containing water. The water is heated by suitable means, such as a steam pipe coil 32 connected at one end to a source of steam supply and at its other end to a steam trap 33. The air enters through a pipe 34 and bubbles up through the water and is thereby washed and heated. 35 indicates a thermometer and 36 a safety valve on the tank 31. The vacuum maintained in the extracting tank 5 acts to draw in the air through the purifying and heating means. The air pipes have cocks by which the flow of air may be regulated or shut off.

The beer is introduced into the tank 5 through a valved supply pipe 37 leading from a suitable storage vat (not shown). 38 is a valved air inlet. The line 39 indicates the normal level of the liquid in the tank 5. 40 is a transparent sight gage (see Fig. 2) by which the level of the liquid may be observed from without the tank and 41 are glass-covered observation holes through which the conditions at various planes in the tank may be observed. The tank may also be equipped with a vacuum gage 42, thermometers 43 and man-holes 44.

By reason of the agitation or spraying of the liquid a large bulk or body of foam accumulates in the tank and this foam may build up to the top of the tank and in some instances might be drawn out through the exhaust conductor 19. In order to prevent such escape of the foam, I break up the bubbles at the top of the body of foam when the foam rises to a certain height. This breaking of the foam may be accomplished in different ways, but the preferred method is to direct a stream of gaseous fluid, preferably air, against the foam to collapse the bubbles. This may be done by means of an injector in the form of a coil of pipe 45 which is supplied by a pipe 46 with heated and purified air from the source heretofore described, the coil 45 having outlet orifices arranged to direct streams of air laterally in all directions. Preferably a horizontal plate 47 is provided above the coil to assist in directing the air jets outwardly toward the wall of the tank, there being a space between the edge of the plate and the wall of the tank. The central portion of the plate may be of conical form. For use in the case of an emergency, I may also employ a supplemental jet-head 48 of suitable construction which is connected by a pipe 49 with the atmosphere, a valve in said pipe normally maintaining the pipe closed. If sufficient air cannot be obtained from the injector 45, additional air may be admitted from the atmosphere through the supplemental injector or head 48. Inasmuch as the atmospheric pressure is greater than that within the tank, the air will rush in through the injectors when open and the force of the air will act to break up the bubbles if the foam approaches the level of said injectors.

I believe myself to be the first to accomplish the result in the art of dealcoholizing liquors of breaking up the foam during operation, or of limiting the height to which the foam may rise, or to provide means for preventing the foam from being drawn off through the exhaust conductor.

In the extracting operation the degree of heat employed, the degree of vacuum produced, and the time required bear a direct relation to each other. The higher the vacuum created, the more rapidly the process of extraction proceeds, and the greater the degree of heat employed, the more quickly the extraction is effected, but too high a degree of heat might produce changes in the character of the organic constituents of the liquid, and I have found it to be better, on the whole, to work with a relatively low degree of heat. I have practised the method successfully with the liquid at a temperature of about 130° Fahr. but a higher or lower temperature may be used and still obtain good results. While a lower vacuum may be used successfully, the best plan of operation seems to be to use a high vacuum and a relatively low degree of heat. The proportion of the alcohol to that of the other vapors released from the liquid is greater under these conditions, that is to say, the maximum amount of alcohol may be thus extracted with the minimum evaporation of the other constituents of the liquid.

The flavoring of the liquid may be accomplished in the following manner: An aroma tank 50 is adapted to contain material to provide flavoring and the upper end of said tank is connected by means of a pipe 51 with a pipe 52 communicating with the bottom of an extracting tank 5 through which latter pipe the dealcoholized liquid is finally withdrawn and conducted into a suitable cooling tank 53. From the cooling tank the liquid may be passed to a suitable receptacle (not shown) where it is impregnated with carbonic acid gas to give the desired effervescence. The aroma tank 50 is equipped with heating means to be presently described. The volatile aromatic extracts from the flavoring material in the aroma tank may pass from said tank through the pipe 51 into the pipe 52 where they may mix with the liquid discharging from the tank 5 to the cooler, or, if desired, such extracts may be drawn by the pump 23 into the circulating liquid from the extracting tank 5 to mix with said liquid during the process of extracting the alcohol from the liquid.

When the liquid being treated is beer, hops may be used as the flavoring material. The aroma tank in the exemplary form disclosed in Fig. 3 is especially well adapted for the treatment of hops. The hops are placed upon a perforated or reticulated screen 54 which extends across the tank. Beneath this screen is a pan or hopper 55, preferably of funnel shape, to catch the liquid trickling through the hops. A pipe 56 leads from the pan 55 to the outer side of the tank where it is valved to permit drawing off the liquid, and the pipe also has a valved by-pass 57 leading into the tank beneath the pan 55. Said pan preferably extends entirely across the tank so as to form a partition, separating the tank into two independent chambers. An equalizer pipe 58, however, communicates with both chambers, so that an equal vacuum may be maintained therein.

The liquid (originally water) in the bottom of the aroma tank is heated by means to be presently described and is circulated and sprayed upon the hops on the screen 54. The circulating and spraying means herein shown includes a valved pipe 59 communicating with the bottom of the tank and with the pipe 52, a pipe 60 communicating with the pipe 52 and leading to the pipe 22 at the opposite side of the outlet from the extracting tank 5, the pump 23, a portion of the pipe 25, a return pipe 61 leading from the last mentioned pipe, and a spraying device 62 located within the upper end of the aroma tank and communicating with the pipe 61. By this means the liquid is drawn from the lower end of the aroma tank and sprayed upon the hops on the screen 54 and the liquid trickles down through the hops, absorbing the extracts therefrom, and then passes through the screen into the pan 55 and flows through the by-pass 57 into the lower end of the tank.

I have herein shown the circulating means for the aroma tank and the extracting tank as having parts in common so that one pump serves for both systems. To permit of this the pipe lines are provided with suitably located valves which may be manipulated to effect the circulation of the liquid in the extracting tank alone, or to shut off communication with the extracting tank and establish a separate circulatory connection with the aroma tank when the flavoring material is to be prepared. For circulation in the extracting tank alone, valves 63, 64, 65 are open and valves 66, 67, 68, are closed. Valve 69 may be either open or closed, depending upon whether it is desired to draw the volatile aromatic extracts of the flavoring material into the circulating system of the extracting tank, on the one hand, or to later admit such volatile extracts to the liquid during the flow of the latter from the extracting tank to the cooler, on the other.

When the liquid in the extracting tank has been circulated sufficiently, and it is desired to circulate the flavoring material in the aroma tank, the valves 63, 64, 65 are closed to cut off the extracting tank and all of the valves in the aroma tank circuit are opened (the latter valves being designated in order 70, 71, 67, 68 and 72). The valve 66 remains closed and the valve 69 may be either open or closed. Valve 73 is closed at all times, except when liquid is being admitted to the cooler. Additional valves not designated by reference numerals are located through all the pipes of the apparatus at proper points for control.

Instead of having a single pump serve for both the extracting tank and the aroma tank, it will be understood that other arrangements may be provided if desired.

It may sometimes happen that the hops will become packed together and press tightly against the screen 54 so as to close the holes in the latter and prevent the proper filtration of the water through the hops and the screen. In order that this condition may be corrected, I provide a valved branch pipe 74 communicating at one end with the pipe 61 and at its other end with the space in the aroma tank beneath the screen 54 and above the pan 55. By thus shutting off the valve 72 for the spraying device 62 and opening the valve in the branch pipe 74 liquid may be injected into the space beneath the screen and caused to pass upwardly through the screen and lift the hops therefrom, so as to clear the screen and at the same time loosen the mass of hops. 75 indicates a valved outlet pipe leading from the top of the tank through the roof of the building to the atmosphere.

The aroma tank is arranged to be tempered by a tempering coil 76 in the lower end thereof and by a tempering coil 77 located in the space between the screen 54 and the pan 55. These coils have valved extensions communicating with a pipe 78 which has valved branches communicating respectively with a source of steam supply for heating and with a source of ammonia or brine supply for cooling. In the present instance, the pipe 78 is connected by a pipe 79 with the steam supply pipe 14 for the water heater 12. The opposite end of the coil 76 communicates with a valved pipe 80 which leads to the steam trap 33 and the coil also communicates with a valved pipe 81 which provides a return for the brine in cooling.

The aroma tank may also be equipped with a vacuum gage 82, thermometer 83, observation glass 84, transparent gages 85 and 86 for the upper and lower chambers, and manholes 87.

In preparing flavoring material, such as hops, the tank is heated by admitting steam to the lower coil 76, a suitable quantity of water having first been placed therein and the hops having been placed on the screen 54, and the circulation of the water is then started as before explained. The fine aromatic substances or essential oils of the hops may rise to the upper end of the tank and pass out through the pipe 51 as set forth. The hot liquid may be circulated through the hops for a suitable period of time and may then be drawn off through the pipe 56 if desired and may be introduced into the cooler 53. If this is done, additional water is placed in the upper part of the tank for boiling the hops. If the first liquid is not to be drawn off, the valve in the by-pass 57 is closed and a suitable quantity of the liquid is retained in the upper chamber of the tank. The steam is then turned off from the lower coil and is turned into the upper coil 77, and the circulation of the water is stopped. The hops may be thus boiled for a period of time necessary to produce or extract the hop bitter. The final treated substance may be drawn off through the pipe 56 for introduction into the cooler or may be let into the lower end of the tank through the by-pass 57 to pass from the tank into the discharge pipe 52 and mix with the dealcoholized beer on its way from the extracting tank to the cooler. If desired, the liquid may be cooled in the aroma tank by admitting brine or ammonia to the tempering coil therein. If this be done, the liquid will absorb some or all of the light volatile oils which have accumulated in the upper end of the tank.

While the aroma or flavoring outfit forms an important part of the apparatus, as a whole, for producing a dealcoholized beverage of fine flavor, said flavoring outfit is not limited to use in conjunction with the other elements of the apparatus but may be used independently for the treatment of flavoring or other materials. It is not necessary that the tank be maintained under vacuum. Indeed material may be prepared under pressure in the tank.

In order that my improved process, as a whole, may be carried on continuously, I may provide a plurality of extracting tanks, and in Fig. 2 of the drawings I have illustrated, by way of example, a construction which is modified by the inclusion of two additional tanks 88 and 89. These tanks are equipped with heating, circulating, spraying, and foam-breaking devices, similar to those just described for the tank 5. The upper ends of the tanks 88 and 89 are connected by pipes to the vacuum exhaust conductor 17. The liquid level in the supplemental tanks is shown at 88$^a$. The second tank is connected with the first tank 5 by the conductor 52$^a$ communicating with the lower end of said first tank and connected to a suitable pump 90. 91 and 92 indicate the conductors leading from the pump respectively to the lower end of the tank 88 and to the spraying devices therein, so that liquid may be circulated by the pump through such spraying devices. 93, 94 and 95 designate the corresponding pipes and 96 the pump for the tank 89.

In the operation of this plural tank structure, a portion of the alcohol is exhausted in the first tank and the liquid is then passed successively into other tanks where the treatment is continued in stages, fresh liquid being introduced into the first tank. The process may thus be carried on continuously and the apparatus is of larger capacity.

The circulatory system for the aroma tank in the plural tank apparatus may be arranged so that any one of the circulating pumps for the individual extracting tanks may be used for circulating the liquid in the aroma tank. To this end valved pipe connections 97 may be made between the pipe 60 and the pipes 91 and 94, and the return pipe 61 may have valved pipe connections with the pipes 92 and 95 of the circulating system for the supplemental extracting tanks. By manipulating the valves, the liquid from the aroma tank may be circulated through any pump desired.

It will be understood that the present exemplary structure is illustrated more or less diagrammatically in the drawings and that the construction shown may be varied widely, especially as to location of pipe lines, valves and other adjuncts and details of construction, without departing from the spirit and scope of the invention.

This application is a continuation in part of my prior application Serial No. 75,921, filed February 3, 1916.

I claim as my invention:

1. The process by which an alcohol-containing liquid may be deprived of some or all of its alcohol, which consists in heating the liquid in a vacuum chamber at a temperature sufficient to volatilize the alcohol and insufficient to coagulate the albuminoids, agitating the body of the liquid in the chamber, and circulating the liquid and causing it to pass through fine spraying devices in conjunction with purified heated air which is previously injected thereinto, whereby to cause the liquid to be broken up into a fine mist to facilitate and expedite the removal of the alcohol, 2. The method of extracting alcohol from a liquid which consists in placing the liquid in a closed chamber maintained under vacuum, heating both the upper and lower portions of the chamber to raise the liquid in the lower portion thereof to a temperature sufficient to volatilize the alcohol and insufficient to coagulate the albuminoids, the heat at the upper end of the chamber acting to prevent premature precipitation of the volatilized extraction, continuously agitating the body of the liquid in said chamber, causing the liquid to be withdrawn from the lower part of the chamber and passed through a spraying device within the chamber above the body of the liquid, injecting purified heated air into the current of the liquid just prior to its passage through the spraying device, whereby to atomize the liquid and expedite the extraction of the alcohol vapor, and creating an exhaust current from the upper end of the chamber to withdraw the alcohol vapor therefrom.

3. The method of wholly or partially extracting the alcoholic content of a liquid which consists in heating the liquid in a vacuum chamber at a temperature sufficient to volatilize the alcohol and insufficient to coagulate the albuminoids, injecting a gaseous fluid into the body of the liquid in said chamber, and circulating the liquid and causing it to be broken up into a fine mist in said vacuum chamber.

4. The method of wholly or partially extracting alcohol from a liquid which consists in heating the liquid under a vacuum to a temperature sufficient to volatilize the alcohol and insufficient to coagulate the albuminoids, causing the liquid to be circulated and to be passed through spraying devices, and injecting a heated gaseous fluid into the liquid in circulation prior to its passage through such spraying devices.

5. The method of wholly or partially extracting alcohol from a beverage which consists in providing a plurality of closed chambers, maintaining said chambers under less than atmospheric pressure, heating the liquid in the first chamber to a temperature sufficient to volatilize the alcohol and insufficient to coagulate the albuminoids, agitating the body of the liquid in the first chamber, causing the liquid to be circulated and passed through spraying devices in the first chamber, injecting a gaseous fluid into the liquid prior to its passage through the spraying devices, then transferring the liquid to the next chamber, heating and circulating the liquid there and causing it to be passed through a spraying device in conjunction with gaseous fluid.

6. The method of extracting alcohol from a liquid which comprises maintaining a high vacuum in a chamber containing the liquid, drawing the liquid from the lower portion of the chamber and discharging the liquid in the chamber above the body of the liquid, causing the liquid so discharged to be broken up into a spray, and allowing a gaseous fluid to be drawn by the vacuum into the conductor of the current of liquid prior to being broken up so as to produce a more finely divided spray.

7. The method of extracting alcohol from a liquid which comprises causing circulation of the liquid being treated from the lower portion to the upper portion of a vacuum chamber, and injecting a gaseous fluid both into the body of the liquid in the lower part of the chamber and into the circuit adjacent to the upper part of the chamber for agitating the body of the liquid and causing the liquid discharged at the upper end of the chamber to be broken up into a fine spray.

8. The method of extracting alcohol from beer which includes the steps of heating the beer in a closed chamber to a temperature sufficient to volatilize the alcohol without producing changes in the character of the organic constituents of the beer, maintaining a high vacuum in said chamber, circulating the beer and causing it to encounter a spraying device so as to be broken up into a spray in said chamber, and allowing gaseous fluid to be drawn by the vacuum into the circulating current of the beer prior to its encountering the spraying device whereby the gaseous fluid will cause the beer to be broken up into a finer spray to expedite the release of the alcohol.

9. The method of extracting alcohol from a liquid which comprises heating a body of liquid in a closed vacuum chamber, causing air to bubble up through the body of the liquid, circulating the liquid by drawing the liquid from the lower end of the chamber and discharging it in the chamber above the body of the liquid, causing the discharged liquid to be broken up into a spray, injecting heated and purified air into the current of liquid just prior to such discharge whereby to more finely divide the spray, creating an exhaust current from the upper end of the chamber, and injecting air into the upper end of the chamber to collapse or break up the foam when it rises to a certain height so as to prevent the foam from being drawn off with the exhaust current.

10. The method of producing a non-alcoholic beverage which comprises circulating the liquid by drawing liquid from the lower portion of a vacuum chamber and discharging it in the chamber at a point above the body of the liquid, causing the discharged liquid to be finely divided or spread out in the chamber, and introducing the volatile aromatic ingredients of a flavoring material into the circulating current of liquid.

11. The method of producing a non-alcoholic beverage which consists in extracting all or part of the alcohol from the liquid, treating hops to cause them to give off volatile aromatic vapors, passing the said liquid to a different receptacle, and injecting the volatile vapors of the hops into the liquid during such passage.

12. An apparatus for extracting alcohol from a liquid comprising, in combination, a closed vacuum tank, means including a conductor leading from the upper portion of the tank for creating an exhaust current therefrom, and an injector head and communicating pipe arranged to direct a stream of gaseous fluid in different directions from a central point in the tank to break up the foam.

13. An apparatus for extracting alcohol from a liquid comprising, in combination, a closed vacuum tank, means for creating an exhaust current from the upper portion of the tank, a coil in the upper portion of the tank communicating with a supply of steam, a coil in the lower portion of the tank adapted to be surrounded by the liquid, and a hot water circulating system adapted to supply the latter coil with hot water.

14. An apparatus for extracting alcohol from a liquid comprising, in combination, a closed tank, means for maintaining a vacuum therein, means for causing the liquid to be broken up or spread out in the tank, a coiled conductor in the tank arranged to be submerged in the liquid for heating the latter, conductors communicating with the first mentioned conductor for circulating water therethrough, and means inclosing a portion of the last-mentioned conductors and communicating with a source of steam for heating said conductors to deliver hot water to said coiled conductor in the tank.

15. An apparatus for producing a non-alcoholic beverage from a liquid which is normally alcoholic comprising, in combination, a vacuum tank, means for circulating the liquid by drawing the liquid from the lower part of the tank and discharging it in the upper part of the tank, an aroma tank equipped with means for treating flavoring material, and a pipe leading from the upper end of said aroma tank and communicating with said circulating means for delivering volatile aromatic elements of the flavoring material to the latter.

16. An apparatus for producing a non-alcoholic beverage from a liquid which is normally alcoholic comprising, in combination, a vacuum tank, means therein for causing liquid to be spread out or finely divided, a pump, pipes connecting said pump with the lower portion of the tank and with the upper portion of the tank in operative relation to said means, an aroma tank equipped with means for treating flavoring material, and a pipe leading from the upper end of said aroma tank and communicating with the first mentioned pipes for delivering volatile aromatic elements of the flavoring material to the latter.

17. An apparatus for producing a non-alcoholic beverage from a liquid which is normally alcoholic comprising, in combination, a vacuum tank, means associated therewith for expediting the release of alcohol from the liquid in the tank, an aroma tank equipped with means for treating flavoring material, a cooler, pipes leading from the lower end of the vacuum tank and from the upper end of the aroma tank, and a pipe communicating with both of said pipes and leading to the cooler whereby the liquid in its passage from the vacuum tank to the cooler may absorb volatile aromatic ingredients from the aroma tank.

18. An apparatus for producing a beverage of little or no alcoholic content comprising means for extracting alcohol from the beverage, a cooler for the dealcoholized beverage, a conductor connecting the lower end of said extracting means with the cooler, an aroma tank adapted to contain a flavoring material and having means for treating the latter, and a conductor connecting the upper portion of the aroma tank with the first mentioned conductor.

19. An apparatus for producing a beverage of little or no alcohol content comprising means for extracting alcohol from the beverage, a cooler arranged to receive the dealcoholized liquid from said means, an aroma tank having means for treating flavoring material, and a connection with the aroma tank permitting the volatile aromatic elements from the latter tank to be absorbed by the liquid.

20. An apparatus for extracting alcohol from a beverage comprising a closed vacuum chamber to contain the liquid, spraying means in the chamber, means for circulating the liquid through said spraying means, and conducting means arranged to inject heated gaseous fluid into the body of the liquid and into the current of circulating liquid just prior to its passage through the spraying device.

21. An apparatus for extracting alcohol from a beverage comprising a closed vacuum chamber, means associated with such chamber for causing agitation of the liquid therein, a spraying device in the chamber, means for circulating the liquid through such spraying device, and a conductor communicating with a source of heated and purified air and connected to discharge the air into the current of liquid just prior to its passage through the spraying device.

22. An apparatus for extracting alcohol from a beverage comprising a vacuum chamber to contain the liquid, means at the lower portion of the chamber for causing agitation of the liquid, means in the chamber above the body of liquid for breaking liquid into a spray, means for circulating the liquid through said spraying device, and means for injecting gaseous fluid into the liquid prior to its coming into association with such spraying device.

23. An apparatus for extracting alcohol from a beverage comprising a plurality of closed vacuum chambers, each equipped with heating means and each having means therein for spreading out or dividing the liquid to expose all parts of the liquid, and means for circulating the liquid in each chamber, the chambers being connected together and adapted to successively treat batches of the liquid whereby the process of alcoholic extraction may be carried on continuously.

24. The method of extracting alcohol from liquids which comprises placing the liquid in a closed tank or chamber, heating the liquid to a temperature sufficient to volatilize the alcohol without precipitating the albuminoids or producing other changes in the character of the organic constituents of the liquid, creating an exhaust current from the upper end of said tank to maintain a high vacuum in the tank and to draw off the volatilized alcohol, heating the upper end of said tank to prevent premature condensation of the alcohol vapor, circulating the liquid by drawing it from the lower portion of the tank and discharging it into the upper portion above the body of the liquid, causing the liquid in circulation to be broken up into a spray in the tank above the body of liquid, and allowing air to be drawn by the vacuum into the body of liquid in the tank and into the circulating current of liquid prior to its encountering said spraying device whereby to increase the subdivision of the spray and produce a very fine mist.

25. The method of extracting alcohol from liquids which comprises placing the liquid in a closed tank or chamber, maintaining a vacuum in said tank, heating the liquid to a temperature sufficient to volatilize the alcohol without precipitating the albuminoids or producing other changes in the character of the organic constituents of the liquid, circulating the liquid by drawing it from the lower portion of the tank and discharging it into the upper portion above the body of the liquid, causing the liquid in circulation to be broken up into a spray in the tank above the body of liquid, and allowing air to be drawn by the vacuum into the body of the liquid in the tank and into the circulating current of liquid prior to its encountering said spraying device so as to break the spray into a fine mist.

26. The method of extracting alcohol from liquids which comprises placing the liquid in a closed tank or chamber, heating the liquid to a temperature sufficient to volatilize the alcohol without precipitating the albuminoids or producing other changes in the character of the organic constituents of the liquid, creating an exhaust current from the upper end of said tank to maintain a vacuum in said tank and to draw off the volatilized alcohol, circulating the liquid by drawing it from the lower portion of the tank and discharging it into the upper portion above the body of the liquid, causing the liquid in circulation to be broken up or spread out in the tank above the body of liquid, and allowing air to be drawn by the vacuum into the tank above the body of liquid and directing the flow of the air so as to collapse any foam that may rise to a certain plane and thereby prevent the foam from being drawn off with the said exhaust current.

27. The method of extracting alcohol from liquids which comprises placing the liquid in a closed tank or chamber, heating the liquid to a temperature sufficient to volatilize the alcohol without precipitating the albuminoids or producing other changes in the character of the organic constituents of the liquid, creating an exhaust current from the upper end of said tank to maintain a vacuum in said tank and to draw off the volatilized alcohol, circulating the liquid by drawing it from the lower portion of the tank and discharging it into the upper portion above the body of the liquid, causing the liquid in circulation to be broken up or spread out in the tank above the body of liquid, and allowing air to be drawn by the vacuum into the tank above the body of liquid whereby to collapse the foam when it rises to a certain height.

28. An apparatus for extracting alcohol from liquids, comprising, in combination, a closed tank, means for creating an exhaust current from the upper end of said tank to draw off the volatilized alcohol and to maintain a high vacuum in said tank, means for heating the liquid in the tank to a temperature sufficient to volatilize the alcohol without precipitating the albuminoids or producing other changes in the character of the organic constituents of the liquid, means for heating the upper end of said tank to prevent premature condensation of the alcohol vapor, means for agitating the body of the liquid in said tank, means for circulating the liquid by drawing it from the lower portion of the tank and discharging it into the upper portion above the body of the liquid, means for causing the liquid in circulation to be broken up into a spray in the tank above the body of liquid, and means for injecting air into the circulating current of liquid prior to its encountering said spraying device so as to produce a very fine mist in the tank and thereby expedite the release of the alcohol.

29. An apparatus for extracting alcohol from liquids comprising, in combination, a closed tank, means for exhausting air and vapors therefrom, means for treating the liquid which may cause foaming of the liquid, means in the tank providing a restricted passage through which the foam must pass if at all after it rises to a certain height, and means to direct the flow of gaseous fluid across such passage to collapse the foam.

30. An apparatus for extracting alcohol from liquid comprising, in combination, a closed tank equipped with means for treating liquid which may cause foaming of the liquid, means communicating with the upper portion of the tank for exhausting air and vapor therefrom, a device located below the outlet to said exhausting means and centrally of the tank to provide an obstruction for rising foam and to furnish a restricted annular passage between the device and the wall of the tank through which passage the foam must pass if at all after it rises to a certain height, and a device located beneath the aforesaid device and communicating with a source of gaseous fluid and arranged to direct a plurality of jets of air outwardly in all directions across said annular passage whereby continuously to collapse the uppermost layer of bubbles of the foam and prevent the foam from being drawn off by said exhausting means.

31. An apparatus for extracting alcohol from liquids comprising, in combination, a closed tank equipped with means for treating liquid which may cause foaming of the liquid, means communicating with the upper portion of the tank for exhausting air and vapor from the tank, and a device in the tank having a conduit connection with the atmosphere through which air will be drawn into the tank because of the lower pressure therein, said device having a plurality of outlets for directing jets of air across the tank at a point below the outlet to said exhausting means, whereby continuously to collapse the uppermost layer of bubbles of the foam and prevent the foam from being drawn off by said exhausting means.

In testimony whereof I have hereunto set my hand.

FRANK FEHR.